June 10, 1952  H. O. GORTON  2,600,109
DUMP RAKE
Filed March 9, 1949  2 SHEETS—SHEET 1
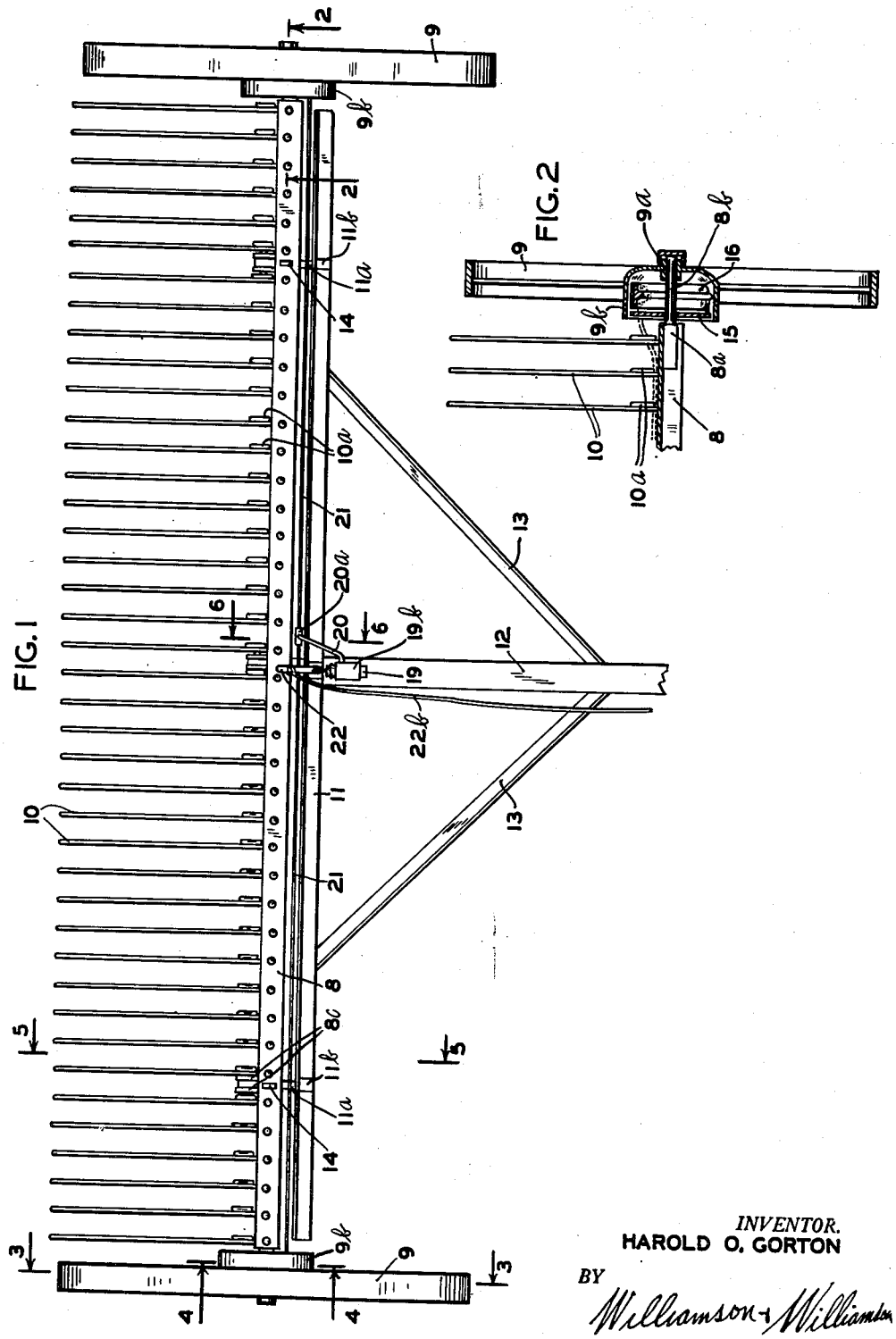
INVENTOR.
HAROLD O. GORTON
BY
Williamson & Williamson
ATTORNEYS June 10, 1952  H. O. GORTON  2,600,109
DUMP RAKE
Filed March 9, 1949  2 SHEETS—SHEET 2
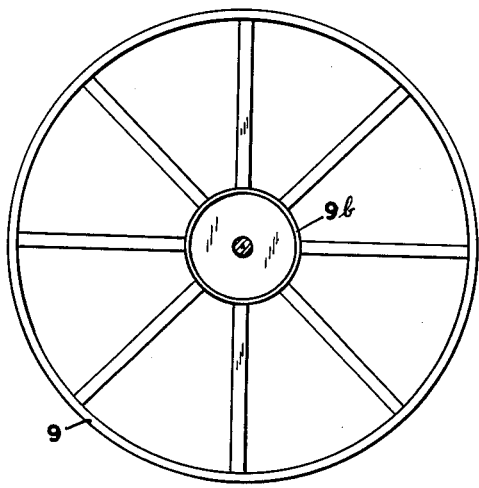
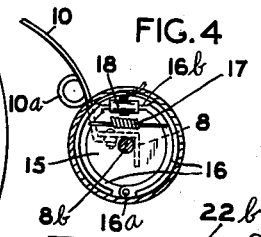
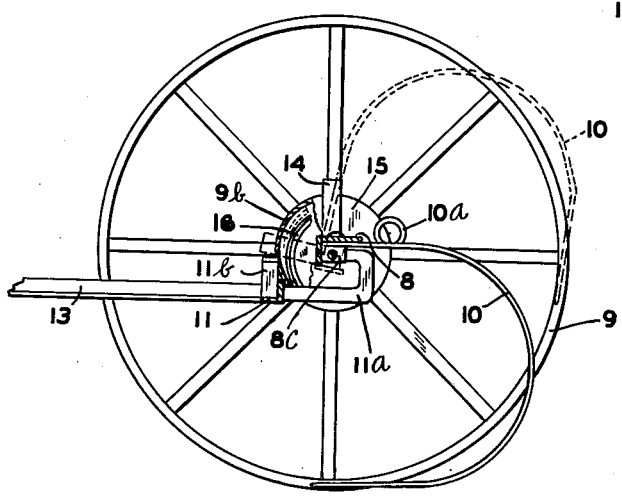
INVENTOR.
HAROLD O GORTON
BY Williamson & Williamson
ATTORNEYS

Patented June 10, 1952

2,600,109

UNITED STATES PATENT OFFICE 2,600,109

DUMP RAKE

Harold O. Gorton, Glenwood, Minn.

Application March 9, 1949, Serial No. 80,371

1 Claim. (Cl. 56—386)

This invention relates to wheeled dump rakes for hay and other stalk crops which are cut on the ground and particularly to a dump rake having readily controllable mechanism for connecting power from the wheels with the horizontal tine bar to rock the bar forwardly and dump the accumulated hay.

Heretofore, most conventional dump rakes have been actuated by dog and abutment mechanism or ratchet and pawl mechanism assembled in the hub of the wheels and the dog or pawl is brought into contact with the abutment by shifting a control lever, thereby applying the power of the running wheels to raise the rake. Upon release of the dog, the rake may be dropped. Such mechanism causes heavy shocks to occur when the dog suddenly engages the abutment or pinion elements. Furthermore, fast and accurate dumping with said mechanisms is difficult because the ratchet or abutment elements of the device must rotate to a point where the dog may engage before power is applied to rock the tine bar. Consequently, accuracy in forming windrows is sacrificed.

It is an object of my invention to provide a wheeled dump rake having power transmission mechanism assembled in the hub portions of the two supporting wheels whereby power may be instantly and accurately applied through control of the driver to rock the tine bar forwardly, lifting the tines and dumping the accumulated hay, all without production of shock or jarring action.

More specifically, it is an object to provide simple but highly efficient power transmission mechanism assembled in the hub structure of the wheels and utilizing an instantly controllable brake mechanism for transmission, preferably of the hydraulic or fluid-actuating type whereby without shock, the tine bar may be instantly connected with the wheels and rocked to dump the load and whereby upon release of the mechanism, the tine bar will rock rearwardly, dropping the tines instantly in operative raking position.

Another object is the provision of a wheeled dump rake of the type described wherein the elongated horizontal tine bar is journaled in and supported at its ends by the usual wheels and has affixed at the hub structure of said wheels, mounting plates carrying brake shoes and fluid-operated wheel cylinders while the hub portions of the wheels carry brake drums for transmitting power, said drums surrounding and housing the brake shoes in a manner in some respects similar to the hydraulic brake assemblies of motor vehicles.

These and other objects and advantages of my invention will more fully appear from the following description made in connection with the accompanying drawings wherein like reference characters refer to similar parts throughout the several views and in which:

Fig. 1 is a top plan view of the major portion of an embodiment of my invention with the forward portion of the draft bar being broken away;

Fig. 2 is a section taken longitudinally of the tine bar along the line 2—2 of Fig. 1;

Fig. 3 is an inner side elevation of one of the wheels detached with the adjacent journal of the tine bar shown in cross section;

Fig. 4 is a cross section taken on the line 4—4 of Fig. 3, showing the brake type power transmission mechanism;

Fig. 5 is a cross section taken on the line 5—5 of Fig. 1; and

Fig. 6 is a detail cross section taken on the line 6—6 of Fig. 1, showing the master cylinder and lever controls.

As shown, my dump rake comprises an elongated tine-supporting bar 8 in the form of a rigid angle bar having longitudinally extending stub axles 8a welded or otherwise rigidly secured to the ends of the bar proper and terminating in journals 8b which are revolubly mounted in and supported by bearings 9a forming a portion of the hub structure of the relatively large side wheels 9. Wheels 9, as shown, are provided with the usual felly and spokes of the type used in conventional hay rakes and have fixed to the hub structure, the concentric, inwardly extending drums 9b.

The tine bar 8 has detachably secured thereto, a multiplicity of spring tooth tines 10 constructed of preferably spring metal and as shown, each having a single spiral convolution 10a adjacent the substantially straight attachment end thereof. Tines 10, as clearly shown in Figs. 1 and 5 extend rearwardly then downwardly and forwardly, the downward portions of the tines being curved and the lower extremities being disposed substantially parallel to the ground although slightly inclined thereto from the tips of the tines rearwardly.

A suitable T-shaped draft frame is swingably connected with the tine bar 8 to facilitate pulling of the rake by a tractor or a draft animal comprising as shown, an elongated horizontal bar 11 which is disposed substantially parallel and in close spaced relation to the tine bar 8. Cross bar 11 is swingably connected to tine bar 8 by a pair of angled or goose-neck connection arms 11a having their main portions extending from the draft bar 11 rearwardly in spaced relation to the tine bar 8 and then being extended upwardly and then forwardly with the upper and forward extremities thereof pivoted in clevis manner between a pair of spaced lugs 8c welded or otherwise rigidly affixed to one of the webs of the angled tine bar 8. Said lugs 8c are disposed for each of the arm connections 11a, some distance inwardly from the ends of the tine bar. A draft or reach bar 12 extends as shown, centrally and longitudinally of the rake with its rear end fixed to the elongated cross bar 11 previously described and provided with a pair of diagonal bracing bars 13 interconnected between the rear portion of the reach bar and the intermediate portions of cross bar 11.

To limit forward rocking movement of the tine bar 8 in respect to the wheels and draft frame, I provide a pair of upstanding stop lugs 14 welded or otherwise rigidly affixed to the upper web of the tine bar 8 and in the raking position of the bar, projecting upwardly therefrom for engagement with bumper pads 11b, which are correspondingly spaced inwardly from the outer ends of the cross bar 11 of the draft frame. These pads may be constructed of metal, wood or somewhat compressible material, if desired.

With the previously described construction, it will be seen that the aggregate weight of the many tines 10 normally holds the tine bar in the full line position shown in Figs. 1 and 5, with the wheels free to revolve on the smoothly journaled ends 8b of the stub axles of the tine bar 8.

I provide instantly operable and highly efficient mechanism to connect the power of the revolving wheels with the tine bar for rocking the bar forwardly for dumping purposes. To this end, I affix to the intermediate portions of stub axles 8b of the tine bar and housed concentrically within the drums 9b, brake shoe mounting plates or discs 15 apertured to receive the stub axles and keyed, welded or otherwise rigidly affixed thereto. These mounting plates or discs as shown in Fig. 4 have pivoted thereto in substantially the conventional manner of brake mechanism of a motor vehicle, a pair of arcuate brake shoes 16 pivoted by the common pivot member 16a at their lower ends and having their upper ends normally urged together by the contractile spring 17. The upper extremities of the shoes 16 are connected by links 16b with a horizontally disposed wheel cylinder 18 mounted on the outer face and adjacent the top of the mounting plate 15.

Pistons (not shown) are mounted in the wheel cylinder 18 in conventional manner and are connected with the links 16b to expand the brake shoes by swinging the same outwardly when fluid under pressure is supplied to the central portion of the cylinder 18. Means for instantly controlling actuation of the shoes 16 is provided, as shown, through the medium of a central master cylinder 19 mounted on a base 19a affixed to the inner end of the elongated reach bar 12 of the draft frame. The discharge of master cylinder 19 is connected by a conduit 20 with a fitting 20a which is in communication with two branch fluid supply lines 21 which are suitably supported just forwardly of the tine bar 8 and each of which connects with one of the wheel cylinders 18. Master cylinder 19 has a supply tank 19b mounted on the top thereof in which a hydraulic fluid may be supplied. An actuating piston works within cylinder 19, having connected to the rear end, the piston rod 19c which has slot and pin connection at its outer end with a control lever 22. A protective, collapsible covering or jacket 23 may surround the piston rod 19c and rear end of cylinder 19 to exclude dust and dirt therefrom. Control lever 22 is pivoted as shown, at its lower end to a lug 22a at the rear end of reach bar 12 and has attached to the upper end thereof, a flexible cord 22b which extends forwardly to the driver's seat (not shown) of a tractor or propelling vehicle.

In operation, the driver watching the previous formation of windrows in swaths of hay or grain previously raked may very accurately dump the contents of the rake at the precise position desired by pulling upon the flexible rope or cable 22b, thereby actuating the piston within master cylinder 19 and instantly communicating to each of the wheel cylinders 18 through the branch lines 21, fluid under pressure. The wheel cylinders 18 for the two wheels of the rake instantly actuate the power applying or brake shoes 16 swinging the same outwardly against the tension of springs 17, to clamp the shoes against the rotating drums 9b of the two wheels.

Power is thus immediately and positively transmitted from the roller wheels to the discs 15 which, fixed to the two ends of the rockable tine bar 8, causes the bar to be rocked or partially revolved forwardly to extreme position where the upstanding abutment lugs 14 engage the bumper elements 11b. In such rocking movement, the tines are lifted from the full line position of Fig. 5 to the dotted line position of Fig. 5, quickly dumping the load and upon release of the rope 22b by the driver, gravity immediately drops the tines and tine bar to the normal raking position.

In operation, the driver usually gives a short pull upon the rope 22b and thereafter, almost immediately releases the same.

With my structure, there is no delay between operation of levers or control elements and interengagement of ratchet or abutment elements with a pawl or dog. The mechanism is positive and operation is immediate with the result that very accurate dumping along a predetermined line in a field may be obtained. Likewise, release of power connection is immediate with the result that raking is almost immediately continued after dumping action with a minimum loss of crops harvested.

As recited, a fluid actuated system which may be of the hydraulic or air type, is employed. The interrelation of the expansible power connection shoes with the rotating drum on the wheels provides a very responsive and positive power connection for the specific purposes enumerated.

It will of course, be understood that various changes may be made in the form, details, arrangement and proportions of the parts without departing from the scope of my invention.

What I claim is:

Hydraulically operated clutch mechanism for momentarily only connecting rotary power from the wheels with the horizontally journaled tine bar of a wheeled dump rake for the purpose of dumping the rake under instant control, having in combination a vertical mounting plate, means for fixing said mounting plate to the journal or trunnion at one end of the tine bar in juxta-position to the inner side of one of the dump rake wheels, a cylindrical drum having means for fixed connection thereof concentrically with the inner side of said last mentioned wheel and in concentric relation also with the journal or trunnion of said tine bar, a pair of outwardly movable clutch shoes mounted on the outer face of said plate for shifting action outwardly in unison and having outer friction surfaces disposed normally in close relation within the confines of said drum, means for urging said clutch shoes inwardly, a fluid wheel cylinder also mounted on said plate and having a pair of outwardly and oppositely movable pistons connected with said clutch shoes for shifting the same outwardly when fluid under pressure is supplied to the central portion of said cylinder mechanism including a master cylinder removed from said wheel and a conduit connected with said master cylinder for instantly supplying fluid under pressure within the middle portion of said cylinder between said pistons, an abutment lug extending generally radially of the axis of said journaled tine bar and fixed thereto for swinging movement with said tine bar and a stationary bumper element disposed in the path of movement of said abutment lug for limiting dumping action of said rate and for facilitating release of said clutch shoes whereby said drum and tine bar are connected only momentarily to produce an instantly controlled, fast dumping action and return of said dump rake.

HAROLD O. GORTON.

REFERENCES CITED

The following references are of record in the file of this patent:

UNITED STATES PATENTS

| Number | Name | Date |
| --- | --- | --- |
| 207,217 | Squire | Aug. 20, 1878 |
| 2,159,137 | Doty | May 23, 1939 |
| 2,197,063 | Ashten | Apr. 16, 1940 |
| 2,471,713 | Baker | May 31, 1949 |